Sept. 1, 1925.
T. C. BENISH
FITTING-UP BOLT
Filed July 30, 1924
1,552,200
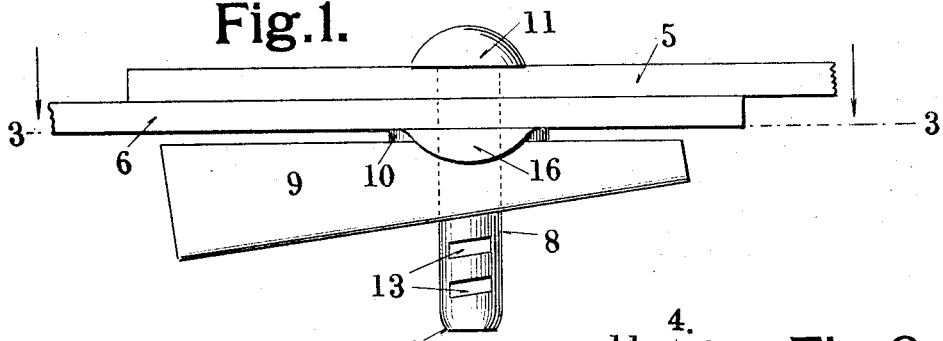
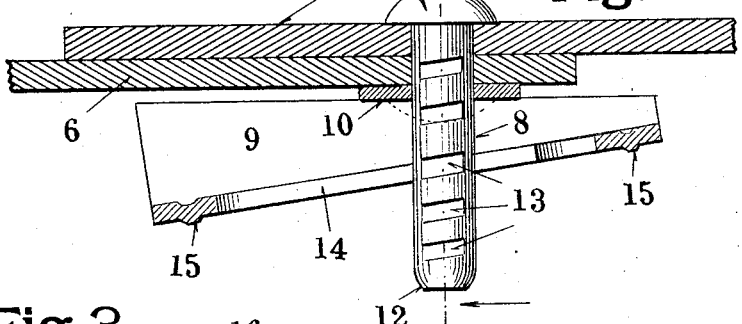
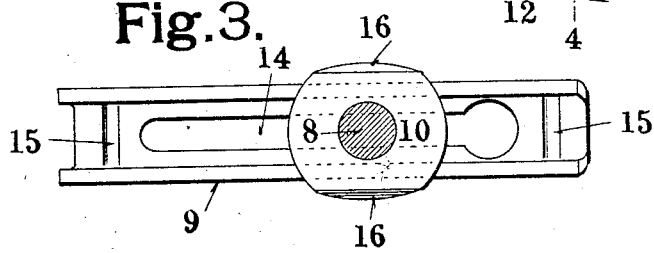
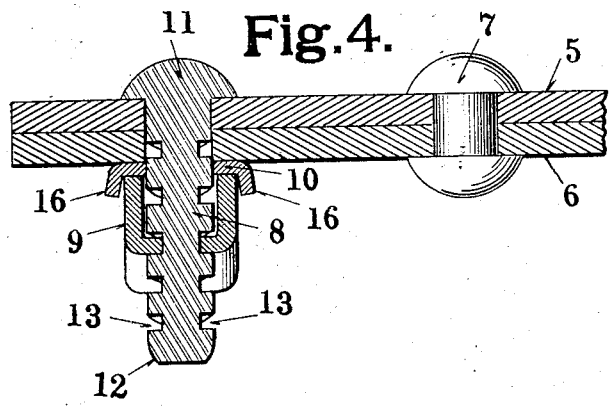
INVENTOR
T. C. BENISH
BY
ATTORNEY Patented Sept. 1, 1925.

1,552,200

UNITED STATES PATENT OFFICE.

THOMAS C. BENISH, OF ST. LOUIS, MISSOURI.

FITTING-UP BOLT.

Application filed July 30, 1924. Serial No. 729,072.

*To all whom it may concern:*

Be it known that I, THOMAS C. BENISH, a citizen of the United States of America, residing at the city of St. Louis, State of Missouri, United States of America, have invented a certain new and useful Fitting-Up Bolt, of which the following is such a full, clear, and exact description as will enable anyone skilled in the art to which it appertains to make and use the same, reference being had to the accompanying drawings, forming part of this specification.

My invention relates to a fitting-up bolt, i. e. a bolt structure adapted to serve as a temporary fastening means for holding together a pair of sheets or plates of metal with their rivet holes in alignment to facilitate the operation of riveting.

The object of my invention is to produce a simple, strong and efficient device and to so construct it that all the parts may be formed by forging or stamping, thus obviating expensive machining operations.

In the accompanying drawings which illustrate one form of fitting-up bolt made in accordance with my invention, together with a pair of metal plates to which the same is applied, Figure 1 is a side view; Figure 2 is a vertical cross section; Figure 3 is a section taken on the line 3—3 of Figure 1; and Figure 4 is a section taken on the line 4—4 of Figure 2.

The metal plates are indicated by the numerals 5 and 6. These plates are provided with aligning rivet holes in the usual manner so that they may be permanently secured together by rivets, one of which is shown at 7 (Figure 4).

The bolt structure comprises the bolt proper 8, a wedge 9, and a bearing member 10. On the upper end of the bolt is a head 11 and the body or shank of the bolt, which is cylindrical, is of such size as to fit snugly in the rivet holes. On account of this snug fit the lower end of the bolt is preferably rounded or beveled as indicated at 12 to facilitate the entrance of the bolt. Formed in the shank of the bolt are a number of inclined grooves 13 arranged in diametrically opposite pairs, as shown in Figure 4. Engaging with the grooves 13 is the wedge 9 which is stamped out of sheet metal so as to be U-shaped in cross section and has formed in its web a key-hole shaped slot 14 for the reception of the bolt. Ribs 15 are preferably pressed in the web adjacent to the ends of the wedge to strengthen the web. Situated between the wedge and the plate 6 is member 10 which not only forms a bearing for the wedge as it is driven home to tighten the bolt, but is provided with a pair of turned down wings 16 engaging the outer faces of the wedge flanges to prevent spreading.

In the use of my device two or more bolts 8 are driven into aligning holes in the plates 5 and 6, a bearing member 10 is placed over each bolt and then the wedge 9 is engaged with the bolt by passing the shank of the bolt through the enlarged end of the slot 14 until the web is brought into alignment with the proper pair of grooves 13 and the wedge driven home to firmly clamp the plates together. Owing to the use of a number of pairs of grooves 13 the bolt will accommodate plates varying greatly in thickness. After the plates are secured together by the bolts a number of rivets 7 are applied after which the bolts are removed and replaced by rivets.

Having fully described my invention, what I claim as new and desire to secure by Letters Patent of the United States is:

1. In a device of the class described, the combination with a bolt provided with grooves in its shank, of a wedge comprising a web and a pair of flanges, and a bearing member for said wedge surrounding said bolt, said bearing member engaging the flanges of the wedge to prevent spreading.

2. In a device of the class described, the combination with a bolt provided with grooves in its shank, of a wedge comprising a web and a pair of flanges, and a plate surrounding said bolt between the web and the work to be clamped and forming a bearing member for the wedge, said plate being provided with a pair of upturned wings engaging the flanges of the wedge to prevent spreading.

In testimony whereof, I have hereunto set my hand this the 28th day of July, 1924.

THOMAS C. BENISH.